Jan. 28, 1969  J. L. COAKLEY  3,424,183
SOLENOID CONTROLLED SERVOVALVE WITH LINEAL OUTPUT
Filed March 15, 1967  Sheet 1 of 4

INVENTOR.
JAMES L. COAKLEY
BY
WOOD, HERRON & EVANS

United States Patent Office
3,424,183
Patented Jan. 28, 1969

1

3,424,183
SOLENOID CONTROLLED SERVOVALVE
WITH LINEAL OUTPUT
James L. Coakley, Camarillo, Calif., assignor to Abex
Corporation, New York, N.Y., a corporation of Delaware
Filed Mar. 15, 1967, Ser. No. 623,285
U.S. Cl. 137—83                    13 Claims
Int. Cl. F15b 5/00, 9/03, 13/16

ABSTRACT OF THE DISCLOSURE

A solenoid operated servovalve delivering an output which varies linearly with a control current applied to the solenoid. The solenoid exerts force on an armature connected to operate a valve, and the valve in turn applies pressure to a movable element causing it to be shifted. Movement of the latter is fed back to the armature through a lever bearing on a cantilevered leaf spring attached to the solenoid armature. The cantilever spring exerts a reaction force on the armature in the same direction as the solenoid force tends to draw the armature, and acts in opposition to a biasing spring. The non-linearity of the solenoid is cancelled by the non-linearity of the feedback coupling.

---

This invention relates to electrohydraulic control valves of the type used for controlling a fluid function such as the rate of flow of pressure fluid in a hydraulic system which the valve serves. Specifically, it relates to an electrohydraulic servovalve for controlling the displacement of a movable element in linear relation to the magnitude and direction of electric current supplied to the valve.

Electrically operated servovalves of the general type with which the present invention is concerned may be employed for a number of purposes, for example, to control the position of a valve spool or a piston or ram. In general, such valves are usually used to control a fluid function, for example the rate of flow of fluid, to cause the flow rate to be increased or decreased to permit the desired operation of the hydraulic equipment which the valve serves.

Such servovalves may have either one or two valve stages, but are most commonly of the two-stage type wherein an electrical input to the pilot or primary stage valve controls the fluid output function of a main or secondary stage valve.

In many applications it is highly desirable that such servovalves have a linear or substantially linear relation between the magnitude of the electrical input signal and the controlled or output function. To that end it has been proposed to establish a linear relation between input current and the displacement of a movable valve element. In the past, to achieve such operation servovalves have often included an electromagnetic torque motor of the rotating armature type having a permanent magnet and four poles to give push-pull operation. Ideally, such torque motors are linear in operation; that is, they produce a torque which is proportional to the input current. For example, in two-stage servovalves of the jet pipe type a torque motor in the first stage is used to deflect a jet pipe. The jet pipe establishes a pressure differential which is applied to effect displacement of a main valve spool. The latter may control rate of fluid flow in a hydraulic circuit. By a suitable feedback coupling between the spool and the jet pipe, the spool can be caused to shift substantially in proportion to the level of the current signal. However, the torque motors used to bring about such linear operating relationships are complex, expensive, and relatively delicate. In contrast, solenoids possess advantages of simplicity and low cost, but produce a non-linear output which varies with the square of the input current, and hence cannot simply be substituted for a torque motor to give equivalent results.

It has been an objective of the present invention to provide a solenoid operated servovalve having a hydraulic control capability which is in substantially linear relation to the magnitude of an electric current signal supplied to the solenoid, and wherein the non-linearity of the solenoid is opposed or cancelled by a substantially equal but opposite non-linearity of a feedback coupling from a movable element whose position is responsive to the solenoid output.

This invention is predicated in part upon feedback coupling geometry which establishes a square law characteristic to offset the opposite square law characteristic of the solenoid. More specifically, a solenoid controlled electrohydraulic servovalve is provided which includes a lever and leaf spring mechanical feedback between the solenoid armature and the controlled movable element that effectively cancels the non-linear operation of the solenoid, thereby giving a resultant linear relationship between input current and displacement of the movable element.

A preferred embodiment of the concept upon which this invention is predicated includes a single pole traction type solenoid which drives an armature connected to a jet pipe type pilot stage of a two-stage servovalve. The second stage of the valve is of the shifting spool type. A bias spring provides a force on the armature opposite to the force thereon provided by the solenoid. Mechanical feedback between the second stage spool and the first stage armature which provides the square law characteristic that nearly cancels the square law characteristic of the solenoid is achieved through a cantilever spring joined to the armature and extending perpendicular to the direction of armature movement, and a lever pivoted to bend the cantilever spring as a function of the shifting of the second stage spool.

The invention may best be further explained with reference to the accompanying drawings, in which.

Figure 1:
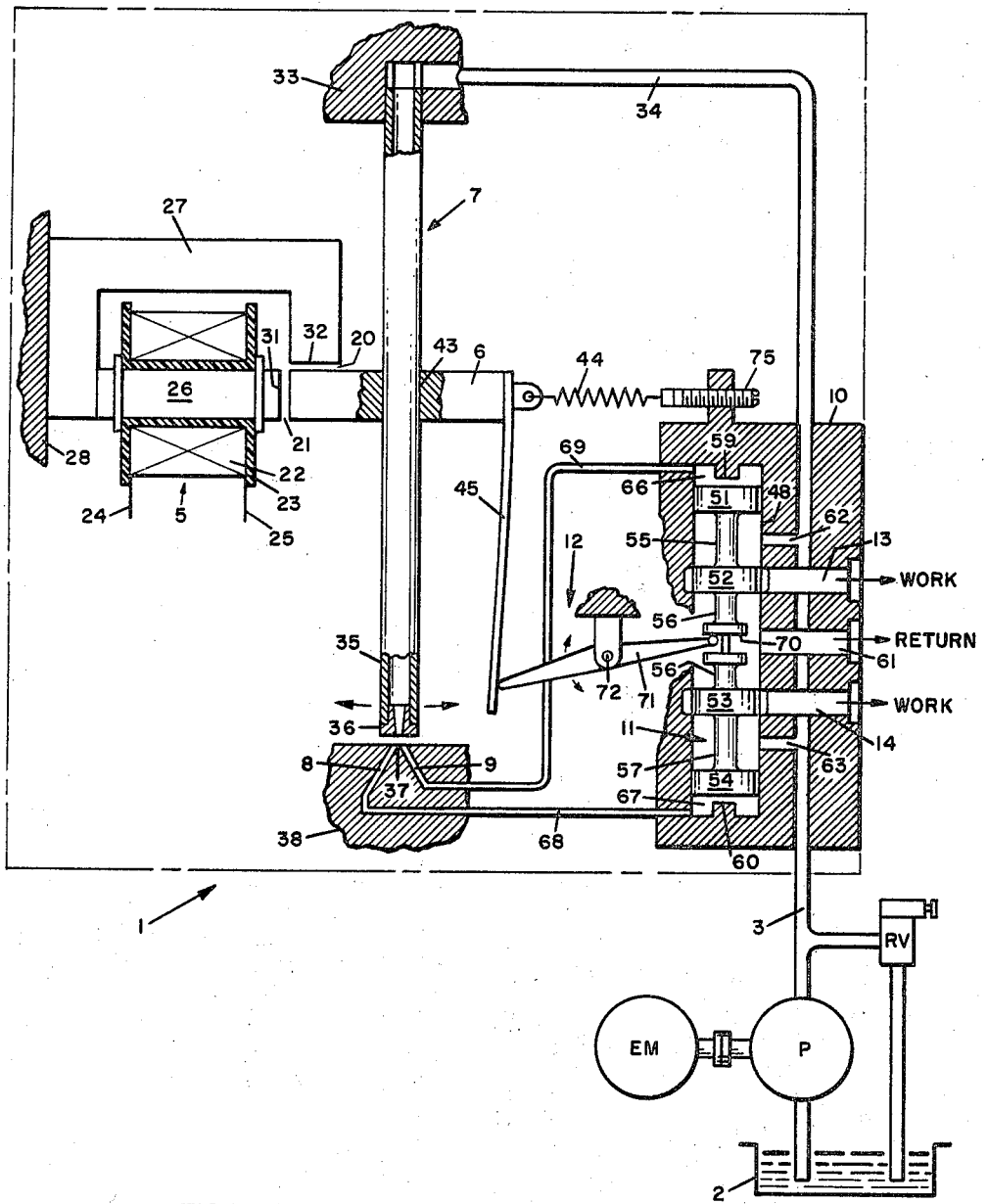
FIGURE 1 is a diagrammatic illustration, partly in section, of a preferred form of two-stage electrohydraulic servovalve of the jet pipe type in accordance with this invention, the servovalve being incorporated in a hydraulic circuit regulating the rate of flow of fluid to a work load.

In the hydraulic circuit shown for purposes of illustration in FIGURE 1, the solenoid controlled linear servovalve in accordance with a preferred form of the invention is shown diagrammatically within the dotted lines, and is designated generally by 1. Valve 1 controls the rate and direction of flow of pressure fluid from a pump P to a load designated at "work" in the drawing. The pump P is driven by an electric motor EM, and receives fluid from a tank or reservoir 2 and has an outlet or pressure line 3 connected to the valve 1. A relief valve RV spills excess fluid from line 3 to tank 2.

The main components of the valve 1 include a solenoid designated generally at 5 which operates a traction type armature 6 connected to a jet pipe 7 to deflect or position a stream of fluid issuing from the latter with respect to a pair of receiver ports 8 and 9. Together these elements comprise the pilot or first stage of the valve 1, which in turn operates a main or second stage of the valve.

The main stage of valve 1 includes a valve body 10 in which is slidable a movable member or main valve element 11 of the shiftable spool type. The position or displacement of spool 11 in body 10 is reflected or "fed back" to the first stage of the valve by means of a feedback coupling designated generally at 12. The main valve stage controls the application of pressure fluid from the pump discharge line 3, to a pair of work ports 13 and 14 connected to the work load which may for example comprise a ram or a rotary fluid motor.

The solenoid 5 of the primary or pilot stage of the valve has a fixed air gap 20 across which the armature 6 moves transversely and a variable air gap 21 in which the armature moves axially. The solenoid 5 includes an electromagnet coil 22 wound around a nonmagnetic spool 23 and having leads 24 and 25 through which an energizing signal or current can be applied. The solenoid spool 23 is mounted on a leg 26 which comprises one part of an approximately D-shaped ferromagnetic pole piece 27, supported by suitable mounting structure indicated at 28. The poles of the electromagnetic circuit are defined at an end face 31 of pole piece leg 26 and at an end face 32 of pole piece 27. The pole faces 31 and 32 are at right angles to one another.

Jet pipe 7 is an elongated flexible or resilient member having one end fixed to a frame or body 33 into which pressure fluid is supplied through a line 34. The other or free end 35 of jet pipe 7 includes means forming a nozzle 36 for directing a jet of pressure fluid from the jet pipe toward the receiver ports 8 and 9 which are adjacent to nozzle 36. The receiver ports 8 and 9 preferably intersect one another diagonally along a knife edge 37 and are formed within a receiver port block 38. In practice the main valve body 10, the solenoid mounting means 28, the jet pipe mounting body 33 and the receiver port block 38 may be integral or may be mounted together to provide a compact unit.

The solenoid armature 6 is a ferromagnetic member which may be in the form of a soft iron bar or plate and is secured around the jet pipe 7 preferably at approximately the midpoint of the latter, for example by brazing the jet pipe 7 into an aperture 43 bored through the armature. The armature presents two perpendicular surfaces one of which is parallel to and adjacent pole surface 31 and the other of which is parallel to and adjacent pole surface 32, the air gaps 21 and 20 respectively being defined between the parallel surfaces. When solenoid 5 is energized it tends to draw armature 6 in a direction reducing the reluctance of the external circuit. Since the armature cannot move along the axis of the jet tube (i.e. in the direction reducing air gap 20), the solenoid draws it toward pole piece 31, thereby displacing the nozzle 36 to the left in the drawing. In other words, the width of air gap 20 remains essentially constant while the air gap 21 constitutes a variable gap. The armature is connected to a biasing spring 44, having a sufficiently low spring rate that it gives nearly constant force over the operating range, which bucks or opposes the tractive force of solenoid 5. A leaf spring 45 in the form of a flat plate or strip is cantilevered to the armature, projecting angularly from it in a direction generally parallel to the axis of jet pipe 7. Near its free end this spring 45 is engaged by the feedback coupling means 12, as will be described.

The spool 11 slides in a bore 48 formed in body 10, and includes four lands 51, 52, 53 and 54, which are axially spaced by circumferential grooves 55, 56, and 57. Stops 59 and 60 at the ends of bore 48 limit axial movement of spool 11 in the bore. When the spool is in the closed or centered position the center lands 52 and 53 form edge or line-on-line seals of work ports 13 and 14 respectively, as shown in FIGURE 1. The space between lands 52 and 53, that is, groove 56, is connected at all times to a return port 61 which may in practice be connected to tank 2. Grooves 55 and 57 are connected at all times to pressure ports 62 and 63 respectively, both of which are connected through body 10 to the pump discharge line 3 and to the jet pipe pressure inlet line 34.

The space between the adjacent end of bore 48 and land 51 comprises a control chamber 66, the application of pressure fluid into which tends to move the spool downwardly in bore 48, while the space at the opposite end of the spool, that is, between land 54 and the other end of bore 48, comprises a pressure chamber 67, pressure in which tends to move the spool upwardly. Receiver port 8 is connected to chamber 67 by a line 68 while receiver port 9 is connected by a line 69 to control chamber 66. When the spool 11 is in centered position, downward spool movement provides a flow path for pressure fluid from pump line 3 through pressure port 62 to work port 13, and a second flow path from the other work port 14 through groove 56 to return port 61. Upward movement of the spool establishes opposite interconnections of the porting. The amount of spool movement or displacement from center position proportionally determines the rate of fluid flow through the work ports 13 and 14, in volumetric units per unit time.

Spool 11 has a pair of spaced opposed shoulders defining a relatively narrow groove 70. A feedback coupling lever 71 is pivoted about an axis 72 for swinging movement relative to body 10, and one end of this lever 71 extends into groove 70 and bears against one of the surfaces thereof, so that when spool 11 is shifted axially lever 71 pivots about axis 72. The other end of lever 72 bears against the tip of cantilever spring 45, loading the spring as shown in FIGURE 1. Thus loaded, the cantilever spring provides a thrust which acts upon armature 6 in the same direction as the solenoid and in the opposite direction to the biasing spring 44. The balancing tension of biasing spring 44 can be set by an adjusting screw 75. Because of the lever ratio about the effective pivot point of the armature 6, the effective force on armature 6 from the cantilever spring 45 is greater than the force applied to the cantilever spring by lever 71.

Pressure fluid is at all times supplied from pump 3 through line 34 to the jet pipe, and FIGURE 1 illustrates the valve 1 in its null, centered or balanced position in which the jet of fluid from nozzle 36 impinges equally between the receptor ports 8 and 9. This equal division of fluid establishes equal pressures in ports 8 and 9 and in the control chambers 67 and 66 respectively. These equal pressures act on equal spool areas defined by lands 54 and 51 and cause no spool movement. With the spool in this position the work ports 13 and 14 are blocked and pressure fluid flows neither to nor from the work load. The null position is ordinarily established by a moderate biasing current applied to leads 24 and 25, which establishes sufficient magnetic flux on armature 6 to hold nozzle 36 in centered position over the ports 8 and 9 against the counteracting force of spring 44. Alternatively, however, bias flux can be established by a separate coil winding on spool 23 passing constant current. This will establish push-pull type operation permitting the valve to control both the direction as well as the magnitude of the fluid flow in ports 13 and 14. Note that in all positions the lever 71 bears angularly against cantilever spring 45.

If a current greater than the biasing current is applied to solenoid 5, a greater tractive force is exerted on armature 6, and the armature moves in a direction decreasing air gap 21, thereby deflecting the jet tube to the left in the drawing so that a greater proportion of the jet stream from nozzle 36 is directed toward port 8. This establishes a pressure differential between lines 68 and 69, and a greater fluid pressure acts in control chamber 67 than acts in control chamber 66. This pressure differential between the chambers moves the spool upwardly establishing a flow path for pressure fluid from port 63 to work port 14, and from work port 13 to return port 61. The spool continues to move upwardly so long as a pressure differential between chambers 67 and 66 exists. However, as spool 11 moves upwardly, the reaction force of lever 71 (which follows the movement) on cantilever spring 45 is reduced and the effective leftward force transmitted through spring 45 to armature 6 is also reduced. Hence, spring 44 draws the armature toward the right as the valve spool 11 continues to shift upwardly, until the stream from nozzle 36 is divided equally between ports 8 and 9. At this point the pressures in chambers 67 and 66 are equalized and spool movement stops.

When a current of magnitude smaller than the normal biasing current is applied to the solenoid, the magnetic tractive force on armature 6 is reduced, and spring 44 moves the armature to the right. This causes a greater proportion of the stream to impinge on receiver port 9, establishing a greater pressure in chamber 66 than in chamber 67, and the spool moves downward in bore 48. As the spool moves downward it swings lever 71 clockwise about axis 72, causing an increasingly greater torque to be applied to cantilever spring 45. This gradually shifts the armature leftward until centered position of the jet is established. The resulting displacement of movable element 11 is substantially proportional to the magnitude of the current applied to coil 22.

Figure 2:
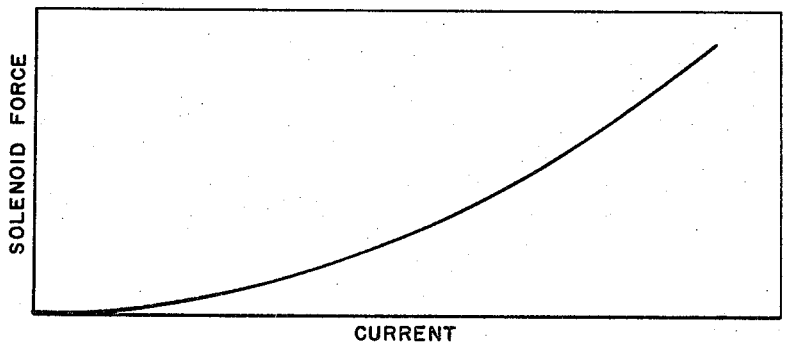
FIGURE 2 is a chart showing the parabola defined by the relation of solenoid force to input current.
Figure 3:
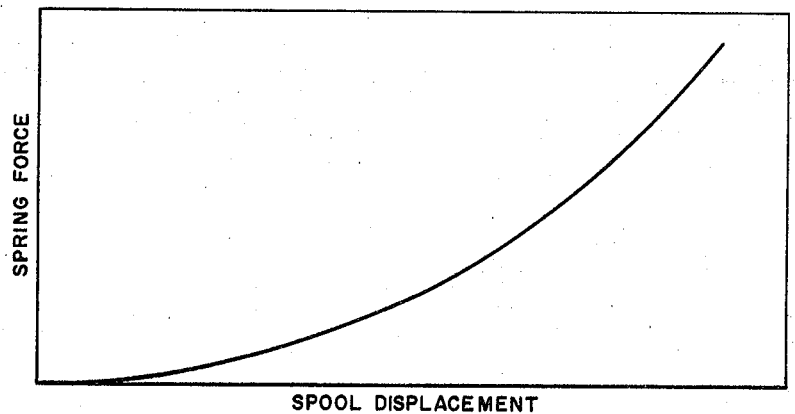
FIGURE 3 is a chart showing the circular arc defined by the relation of cantilever spring force to spool displacement.

The force output of solenoid 5 follows a square law; that is, the magnetic tractive force exerted by solenoid 5 on armature 6 varies with the square of the input current, for any given air gap (see FIGURE 2). By the feedback coupling 12 which I have invented, this square law characteristics of the solenoid is offset by an essentially equal and opposite characteristic of the cantilever spring 45. In other words, I have provided a non-linear feedback coupling which substantially cancels the non-linearity of the solenoid. This occurs for the following reason: Movement of spool 11 produces an angular rotation of lever 71 which, over the small range of spool displacements required, is very nearly proportional to the spool displacement; for small angles, $\sin \theta = \theta$. As the end of lever 71 opposite the spool moves in its arc it exerts a changing reaction force on the cantilever feedback spring 45, and this force, amplified by the lever ratio about the effective armature pivot point, is applied through the spring to the armature. The feedback linkage 12 makes use of the fact that the arc of the circle through which the tip of lever 71 swings very nearly coincides with a parabola for small arcs, so that as a result the reduction in force on the cantilever spring 45 produced by deflection of the cantilever varies essentially as the square of spool displacement. FIGURES 2 and 3 demonstrate the interrelationships between current and solenoid force, and cantilever spring force and spool displacement.

Figure 4:
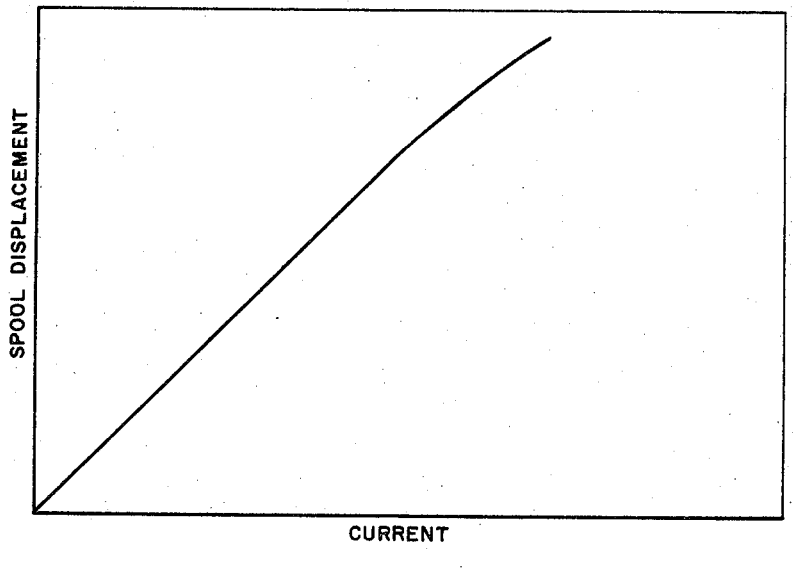
FIGURE 4 is a chart showing the essentially linear relation of spool displacement to solenoid current.

In the steady state the projector 36 is centered over the receivers 8 and 9, and the width of the variable solenoid air gap 21 is the same regardless of the input current. Because this is the case, the solenoid characteristic follows a square law and is nearly cancelled by the feedback square law characteristic, giving a resultant linear relationship between coil current and spool displacement. While these are the major force components determining the valve output, there are certain additional, but minor, non-linearities that do not permit absolute perfect linearity to be achieved. The significance of those is dependent upon the particular geometry chosen. Nonetheless, their amount is not great and the operation of the overall valve is substantially linear, as can be seen in FIGURE 4.

The force exerted by biasing spring 44 is optimally set to equal the effective force from the cantilever spring as reflected at the armature 6 when the projector 36 is centered over the receivers 8 and 6, and a line drawn between pivot 72 and the contact joint between lever 71 and spring 45 is perpendicular to the surface of spring 45. The force of biasing spring 44 can be adjusted by screw 75. Changes from this ideal relation cause a change in null position, linearity change, and change the gain of the advice. Properly used, the adjustability of spring 45 will provide a means of reducing non-idealities.

It should be noted that the force of the cantilever spring on lever 71 loads the lever against one side of the groove 70 in spool 11, which eliminates the need for a close fit of the lever in groove 70.

Figure 5:
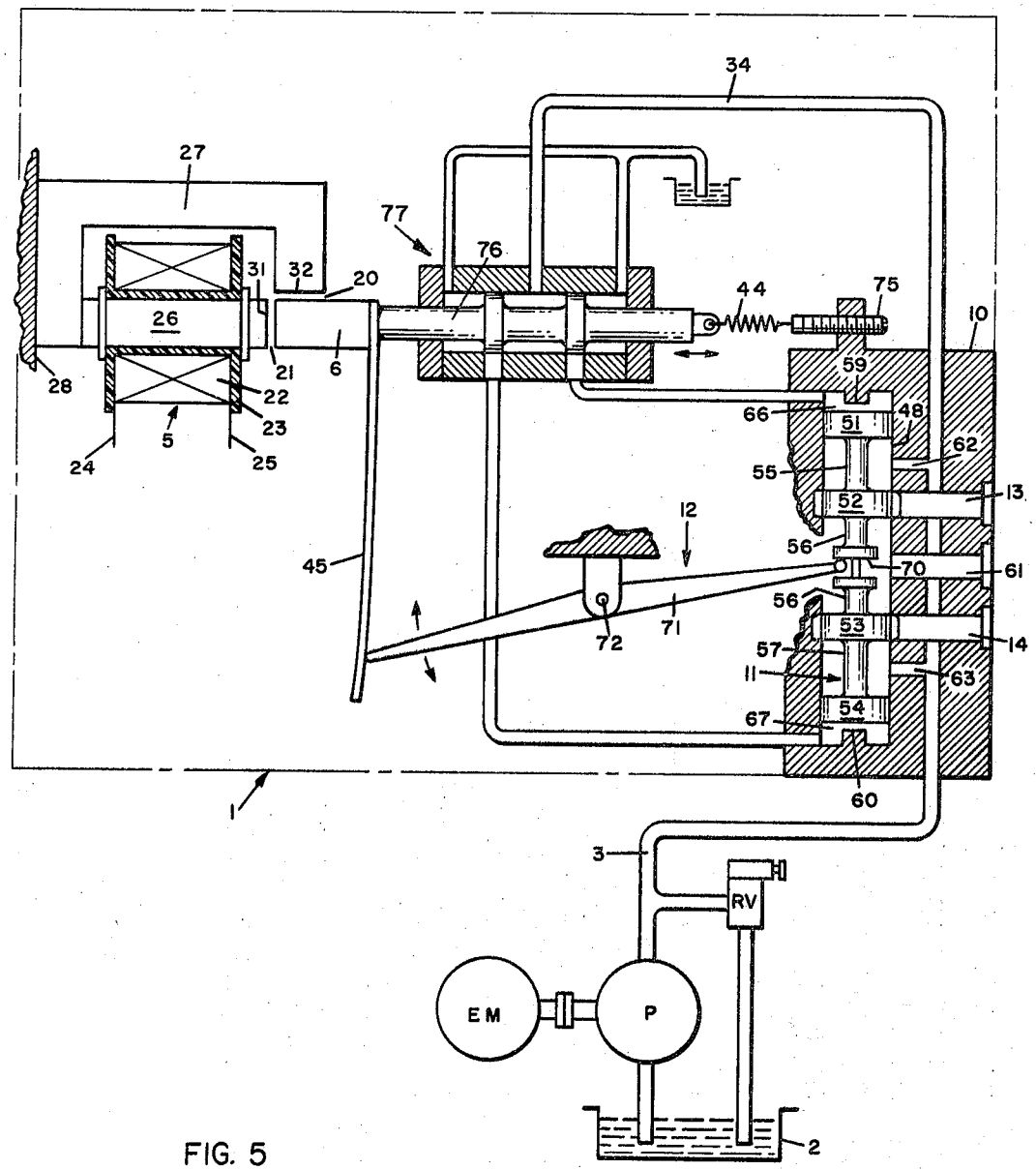
FIGURE 5 is a diagrammatic illustration of a modified form of the invention.

By the means described a simple, inexpensive and relatively sturdy solenoid can be used to operate a valve mechanism to produce a spool displacement or fluid control function which varies substantially linearly with input current. Those skilled in the art will appreciate that the principles of this invention can be used in servovalves wherein the armature is connected to operate a valve other than a jet pipe type valve; for example, the armature may operate a spool type pilot valve. FIGURE 5 shows a servovalve in accordance with a second form of the invention wherein the armature 6 is connected directly to the spool 76 of a spool type valve designated generally at 77.

Figure 6:
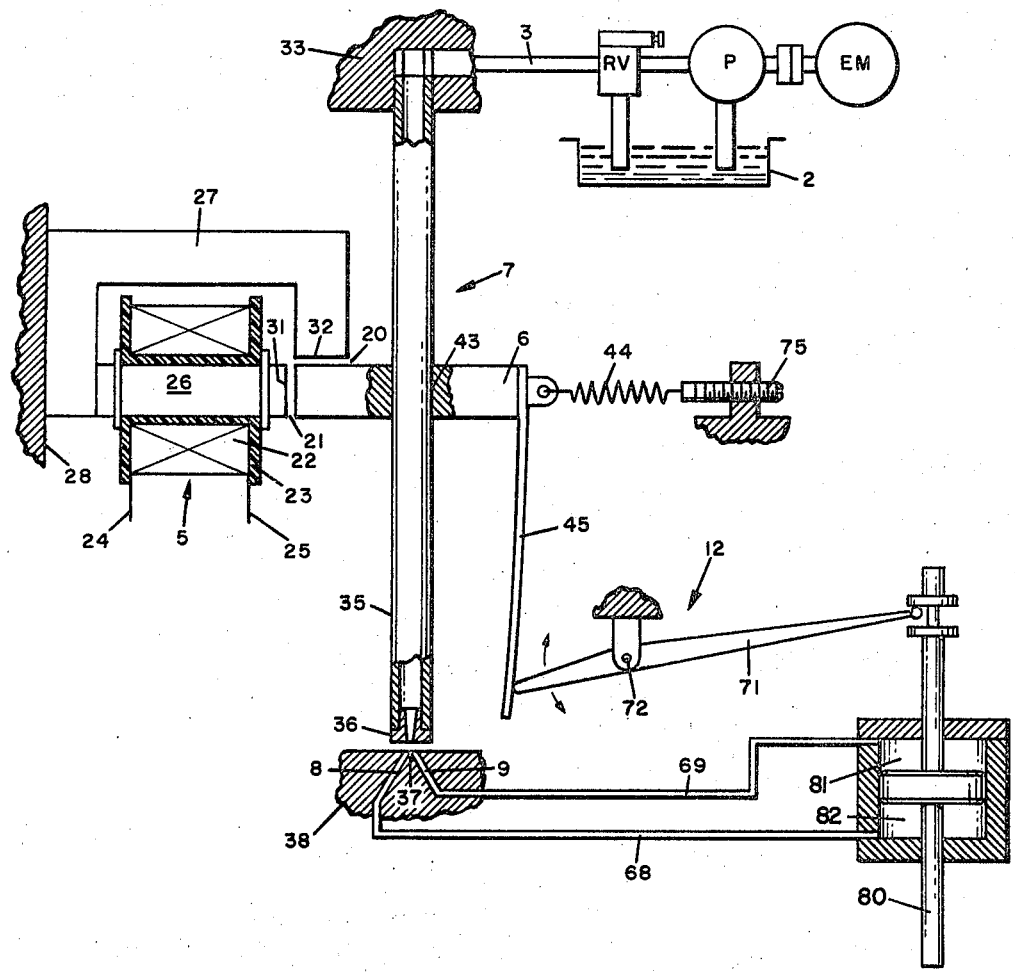
FIGURE 6 is a diagrammatic illustration of still another form of servovalve embodying the principles of the invention.

It will also be appreciated that the movable element which is controlled to move in proportion to coil current (spool 11 in FIGURE 1) can alternatively be a ram, piston or other pressure operated device, rather than a spool of a second valve stage. FIGURE 6 of the drawings shows a servovalve in accordance with the invention in which the pressure differential established by a jet pipe 7 is applied between control chambers 81 and 82 to move a ram 80 which is coupled by the lever system 12 to the cantilever spring 45.

Having described my invention, I claim:

1. A solenoid controlled servovalve for displacing a movable element is substantial proportion to the magnitude of a current signal, comprising
    a solenoid having an armature movable in a single variable air gap,
    a biasing spring connected to urge said armature in the direction opposite to the direction said solenoid urges said armature,
    a leaf spring projecting from said armature,
    a valve operated by movement of said armature,
    a movable element caused to be moved by operation of said valve, and
    a lever pivoted to be swung by movement of said movable element, said lever bearing slidably against said leaf spring at a point thereon removed from said armature.

2. The servovalve of claim 1 wherein said solenoid is of the single pole traction type and said armature is movable axially in a variable air gap of said solenoid.

3. The servovalve of claim 2 wherein said valve operated by movement of said armature comprises a jet pipe which is displaced relative to a pair of receiver ports by movement of said armature.

4. The servovalve of claim 3 wherein said jet pipe is secured in an opening in said armature and extends at a right angle to the direction of armature movement.

5. The servovalve of claim 4 wherein said movable element is the spool of a second valve stage operated by said jet pipe.

6. The servovalve of claim 5 wherein said lever has one end bearing against a surface of said spool, and is loaded thereagainst by said leaf spring.

7. The servovalve of claim 1 wherein said lever normally bears against said leaf spring at an acute angle.

8. The servovalve of claim 1 wherein said biasing spring is a coil spring acting axially on said armature.

9. The servovalve of claim 1 wherein said valve operated by movement of said armature is a spool valve.

10. The servovalve of claim 1 wherein said movable element caused to be moved by operation of the valve operated by movement of said armature is a piston.

11. The servovalve of claim 1 wherein said leaf spring is a flat strip mounted at one end at a right angle to said armature.

12. A solenoid controlled servovalve for displacing a movable element in substantial proportion to the magnitude of a current signal, comprising a solenoid having an armature movable axially in a single variable air gap and transversely across a fixed air gap, said air gaps being defined between pole faces which are at right angles to one another and surfaces of said armature which are parallel to the respective pole faces, a biasing spring connected to urge said armature in the direction opposite to the direction said solenoid urges said armature, a leaf spring projecting from said armature, a valve operated by movement of said armature, a movable element caused to be moved by operation of said valve, and a lever pivoted to be swung by movement of said movable element, said lever bearing slidably against said leaf spring to bend said leaf spring in response to shifting of said movable element.

13. A solenoid controlled servovalve for displacing a movable element in substantial proportion to the magnitude of a current signal, comprising a solenoid having an armature movable in a single variable air gap, a biasing spring connected to urge said armature in the direction opposite to the direction said solenoid urges said armature, a leaf spring projecting from said armature, a jet pipe valve including a jet pipe connected to said armature and deflected relative to a pair of receiver ports by movement of said armature, a spool valve having a spool operated by pressures developed at said receiver ports by said jet pipe valve, and a lever pivoted to be swung by movement of said spool, said lever bearing against said leaf spring to bend the latter in a direction adding to the force of said solenoid on said armature.

References Cited

UNITED STATES PATENTS

| | | | |
|---|---|---|---|
| 2,638,875 | 5/1953 | Bowditch | 91—382 |
| 2,814,183 | 11/1957 | Holzbock | 137—83 X |
| 2,884,906 | 5/1959 | Atchley | 137—83 X |
| 3,208,352 | 9/1965 | Lucien | 91—387 X |

ALAN COHAN, *Primary Examiner.*

U.S. Cl. X.R.

91—3, 365; 137—625.64